United States Patent [19]

Huperz et al.

[11] 4,306,728
[45] Dec. 22, 1981

[54] SLIDING SURFACE PACKING

[75] Inventors: Adalbert Huperz, Hockenheim; Wolfgang Maasberg, Hünxe-Krudenburg, both of Fed. Rep. of Germany

[73] Assignee: Woma-Apparatebau Wolfgang Maasberg & Co. GmbH, Fed. Rep. of Germany

[21] Appl. No.: 136,769

[22] Filed: Apr. 3, 1980

[30] Foreign Application Priority Data

Apr. 3, 1979 [DE] Fed. Rep. of Germany ....... 2913229

[51] Int. Cl.³ .......................... F16J 15/12; F16J 15/18
[52] U.S. Cl. ................................ 277/125; 277/188 R; 277/DIG. 6; 92/168
[58] Field of Search ........................ 277/102, 123–125, 277/188 A, DIG. 6, 188 R, 180; 92/168, 252

[56] References Cited

U.S. PATENT DOCUMENTS

| | | | |
|---|---|---|---|
| 2,292,543 | 8/1942 | Patterson | 277/125 X |
| 3,019,739 | 2/1962 | Prosser | 277/124 X |
| 3,168,869 | 2/1965 | Sieghartner | 277/123 X |
| 3,231,460 | 1/1966 | Andrews | 277/DIG. 6 X |
| 3,559,950 | 2/1971 | Nelson | 277/125 X |
| 3,655,207 | 4/1972 | Schettler | 277/125 |
| 3,698,726 | 10/1972 | Schettler | 277/125 |

FOREIGN PATENT DOCUMENTS 763306 7/1967 Canada ................................ 277/123

*Primary Examiner*—Robert S. Ward, Jr.
*Attorney, Agent, or Firm*—McGlew and Tuttle

[57] ABSTRACT

A sliding surface packing for use in pumps and particularly high-pressure pumps between spaced apart pair of prop rings and a pump plunger and a pump cylinder wall comprises a plurality of packing rings arranged between the prop rings. At least one of the packing rings comprises a rigid high-pressure ring and at least one packing ring comprises a flexible leakage ring and at least one packing ring comprises a high-pressure ring. A plurality of self-lubricating packing rings form guide rings embedding the leakage ring between adjacent ones of said self-lubricating guides forming a pack of laminations.

6 Claims, 1 Drawing Figure

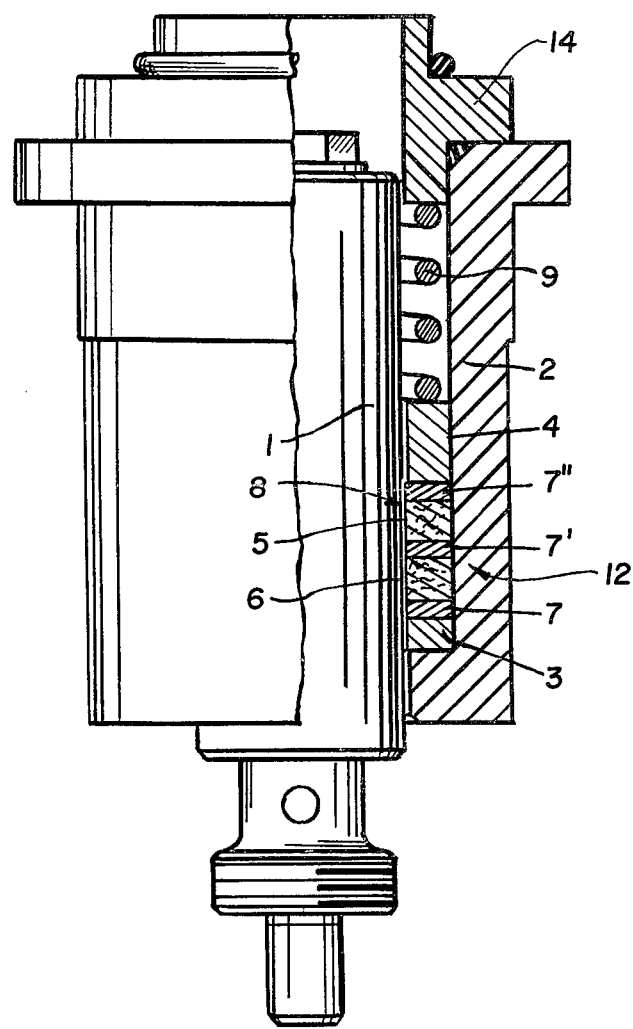

SLIDING SURFACE PACKING

FIELD AND BACKGROUND OF THE INVENTION

The invention relates in general to packing for sliding surfaces and in particular to a new and useful sliding surface packing for use in pumps, particularly high-pressure pumps, between plunger and cylinder wall, with a plurality of packing rings arranged between prop rings.

Sliding surface packings are sealed contact joints on sliding surfaces for which a permanent self-acting seal over a long operation period is desired. Particularly problematic is the situation when high pressures and very high pressure differences must be sealed, as is the case in pumps, and particularly in high-pressure pumps. In these cases, conventional gaskets stuffing box packings, etc. usually fail. This applies at any rate when certain physical, chemical and mechanical requirements must be met at the same time. This is where the invention comes in.

SUMMARY OF THE INVENTION

The invention provides a sliding surface packing for pumps and particularly for high-pressure pumps, which is characterized not only by minimum leakage and long service life, but also by insensitivity to abrasive materials as well as resistance to different flow media, with a simple design as far as manufacture and assembly are concerned.

The invention includes at least one packing ring in the form of a rigid high-pressure ring, and at least one packing ring comprising a flexible leakage ring. The high-pressure ring and the leakage ring are embedded between self-lubricating guide rings, forming a pack of laminations. In the sliding surface packing according to the invention, the high-pressure ring is characterized by resistance and substantial incompressibility. This high-pressure ring ensures the necessary resistance to different flow media, like oils, fats and water, in a wide pH range. It is also resistant to abrasive materials. The leakage ring as an adaptable and plunger protecting packing ring, has a creep resistance sufficient to avoid minimum leakage and the intake of secondary air, which causes cavity damages. The self-lubricating rings ensure minimum friction and excellent heat elimination.

These above two properties are obtained optimally according to a preferred embodiment of the invention when the high-pressure ring comprises a PTFE-impregnated mesh of PTFE fibers, the leakage ring comprises a PTFE-impregnated mesh of bast fibers, e.g. ramic fibers, and the guide rings comprises carbon. Surprisingly, a lapped packing sleeve is formed with such a sliding surface packing. This packing sleeve is a film carbon which, starting from the guide rings, covers the entire packing surface of the sliding surface packing. This result is a true bond between the individual packing rings forming the pack of laminations. This pack of laminations forms a structural unit in the embodiment of an extremely precise packing sleeve with the advantages of an extremely small sealing gap between its packing surface and the plunger. Obviously it is due to the surprising effect of the sleeve formation that the sliding surface packing according to the invention can be used for sealing pressure differences of up to 750 bar.

According to a special and inventive embodiment, the pack of laminations comprises in a pressure direction of a brass ring as a prop ring, a guide ring, the leakage ring, another guide ring, the high-pressure ring, a third guide ring and a corrosion-resistant steel ring as a prop ring. The steel ring advantageously comprises chrome-nickel-steel.

The advantages achieved by the invention are seen substantially in the fact that a surface sliding packing is provided for use in pumps, particularly high-pressure pumps, which is characterized by minimum leakage and long service life. This is due to the fact that low friction and optimum heat elimination are ensured as well as insentivity to abrasive materials and resistance to different flow media. Beyond that, a good seal is achieved against secondary air, and thus against caviation damages.

Finally, a simple design is achieved both in terms of manufacture and of assembly. The sliding surface according to the invention can be used without changes on existing pumps, and particularly high-pressure pumps, and it ensures compensation with initial spring tension.

In accordance with the invention there is provided a sliding surface packing for use in pumps particularly high-pressure pumps and between a spaced pair of prop rings and a pump plunger and a pump cylinder wall which comprises a plurality of packing rings arranged between the prop rings, at least one of the packing rings comprising a rigid high-pressure ring and at least one of the packing rings comprising a flexible leakage ring and still another packing ring comprising a high-pressure ring and including a plurality of self-lubricating packing rings forming guide rings embedding said leakage ring between adjacent ones of said self-lubrication guide rings, and forming therewith a pack of laminations.

A further object of the invention is to provide sliding surface packing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

The only FIGURE of the drawings is a partial side elevational and part sectional view of a cylinder piston pump having a sliding surface packing according to the invention.

DESCRIPTION OF THE PREFERRED EMBODIMENT

Referring to the drawings in particular the invention embodied therein, comprises a sliding surface packing for use in a pump, particularly a high pressure pump having a spaced pair of prop rings 3 and 4 engaged around a pump plunger 1 located between the plunger exterior and the interior of a cylinder wall 2.

The represented sliding surface packing is destined for use in pumps, particularly a high-pressure pump 10, and between a pump plunger 1 and a cylinder wall 2. In its principal design it has a plurality of packing rings 7, 7',7" etc. and rings 5 and 6 arranged between prop rings 3 and 4. One packing ring 5 comprises a rigid high-pressure ring, and one packing ring 6 comprises a fixible leakage ring. High-pressure ring 5 and leakage ring 6 are embedded between packing rings 7, 7', 7" which comprise self-lubricating guide rings forming a pack of laminations. The high-pressure ring 5 comprises a PTFE-impregnated mesh of PTFE fibers, while the leakage ring 6 comprises a PTFE-impregnated mesh of bast fibers, e.g. ramie fibers. Guide rings 7 comprise carbon.

A pack of laminations 12 comprises, proceeding in a pressure direction: a brass ring as prop ring 3, a first guide ring 7, leakage ring 6, a second guide ring 7', a high-pressure ring 5, a third guide ring 7", and a corrosion-resistant steel ring as prop ring 4. In addition, a carbon film 8 is indicated which forms a lapped packing sleeve, which is formed, after the surface sliding packings according to the invention has been inserted into the cylinder 2 starting from guide rings 7. This sliding surface packing is prestressed by means of a spring 9 disposed between prop ring 4 and a cover 14, so that wear compensation is also achieved. PTFE stands for polytetrafluorethylene, as is known.

While a specific embodiment of the invention has been shown and described in detail to illustrate the application of the principles of the invention, it will be understood that the invention may be embodied otherwise without departing from such principles.

What is claimed is:

1. A sliding surface packing for use in pumps, particularly high-pressure pumps between a spaced pair of prop rings and a pump plunger and a pump cylinder wall, comprising a plurality of packing rings arranged between prop rings, at least one of said packing rings comprising a high-pressure ring and at least one of said packing rings comprising a flexible leakage ring, said packing ring also including a plurality of self lubricating packing rings forming guide rings embedding said leakage ring between adjacent ones of said guide rings forming a pack of laminations therewith.

2. A sliding surface packing according to claim 1 wherein said high-pressure ring comprises a PTFE-impregnated mesh of PTFE fibers.

3. A sliding surface packing according to claim 1 wherein said leakage ring comprises a PTFE-impregnated mesh of bast fibers, for example, ramie fibers.

4. A sliding surface packing according to claim 1, wherein said guide rings comprise carbon.

5. A sliding surface packing according to claim 1 wherein said pack of laminations comprise in the pressure direction a brass ring forming a prop ring, a guide ring, a leakage ring, a second guide ring, a high-pressure ring, a third guide ring, and a corrosion resistant steel ring forming a prop ring.

6. A sliding surface packing for use in pumps comprising a pump cylinder, a plunger slidable in said cylinder, first and second axially spaced apart prop rings disposed in said cylinder between said plunger and said interior said cylinder, a plurality of packing rings disposed between said prop rings at least one comprising a rigid high-pressure ring, at least one other comprising a flexible leakage ring, and guide ring means embedding said packing rings forming a laminate structure thereof between said prop rings.

* * * * *